Sept. 27, 1966          C. E. HILLS          3,274,890
UNIVERSAL MILLING MACHINE
Filed Jan. 14, 1965          2 Sheets-Sheet 1
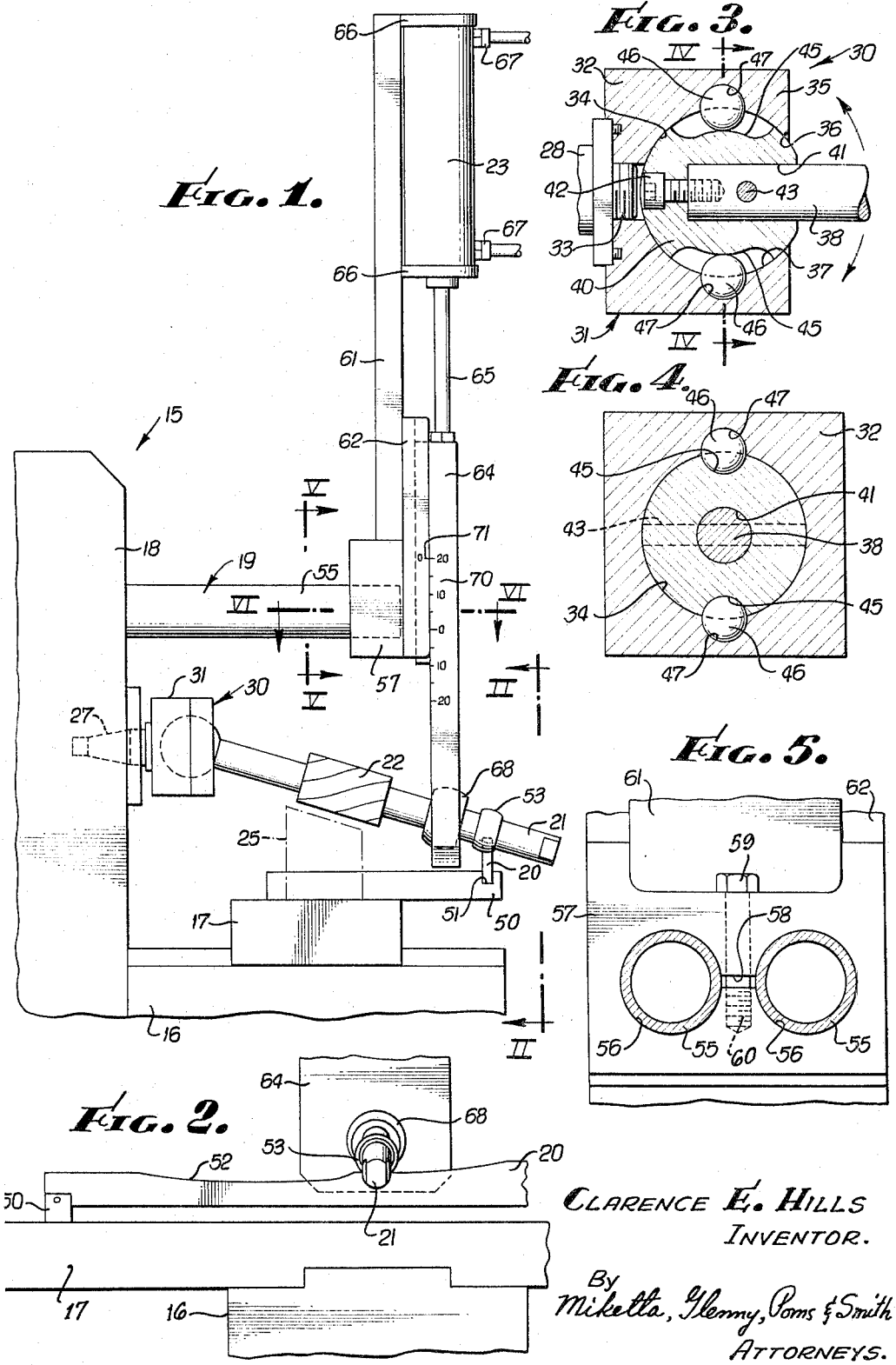
CLARENCE E. HILLS
INVENTOR.
By Miketta, Glenny, Poms & Smith
ATTORNEYS.

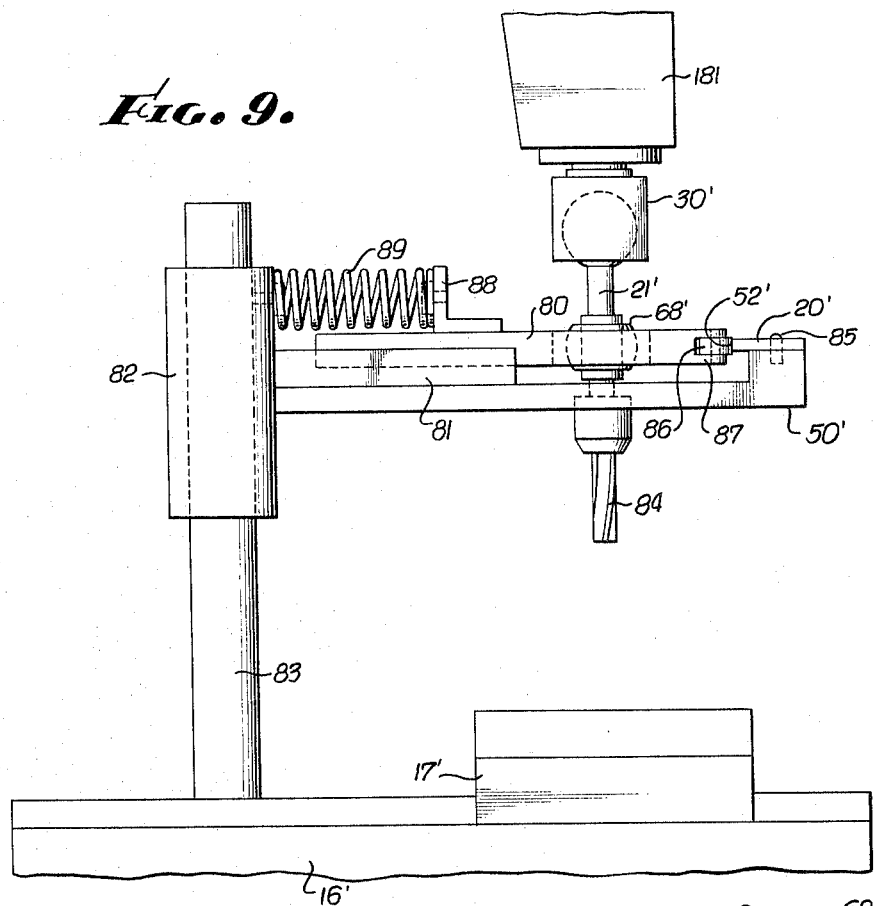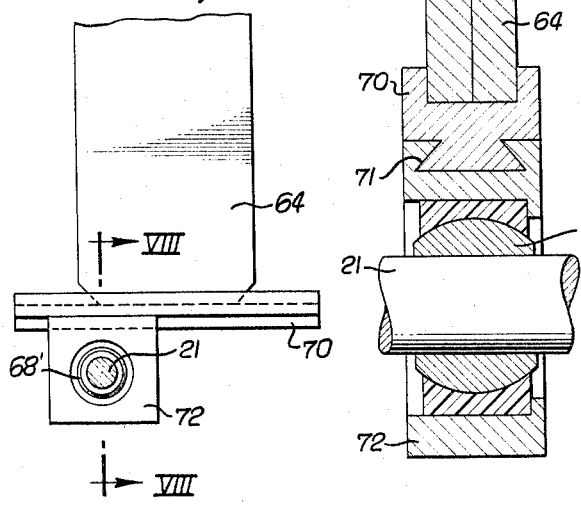

United States Patent Office 3,274,890
Patented Sept. 27, 1966

3,274,890
UNIVERSAL MILLING MACHINE
Clarence E. Hills, Los Angeles, Calif.
(13512 S. Purche Ave., Gardena, Calif.)
Filed Jan. 14, 1965, Ser. No. 425,562
9 Claims. (Cl. 90—13)

This invention relates to a milling machine and, more particularly, to a novel construction and operation of a multi-purpose arbor shaft which increases the utility of a plane or vertical milling machine.

In general, prior proposed milling machines include a reciprocally movable work bed driven past a milling cutter located at a cutting station and adjustable at said station for desired depths of cut. Prior proposed means for enhancing the adaptability or utility of such a plane milling machine have been relatively complex and have included modifications of the milling head structure or milling bed to provide a desired result.

The present invention relates to a novel construction and operation of an arbor shaft which is provided with a swivel mounting at one end and a support and tool pressure attachment adjacent its other end. In one example of the invention, the cutting tool is carried centrally of such an arbor shaft; in another example of the invention, the cutting tool is carried at the end of the arbor shaft with the support means for the arbor shaft between the cutting tool and the swivel mounting of the shaft. The present invention contemplates a simple, effective arrangement of an arbor shaft which is useful on various types of milling machines, such as a plain milling machine or a vertical milling machine. The present invention has particular utility in providing means for converting standard plain or vertical milling machines into milling machines capable of contour milling, spiral milling, while still permitting end milling, slab milling, and the like.

The primary object of the present invention therefore is to disclose and provide a milling machine construction adaptable for many milling machine uses and purposes.

An object of the present invention is to disclose and provide a novel mounting and support for an arbor shaft which may carry a cutting tool.

Another object of the invention is to disclose and provide a novel arrangement for converting a plain milling machine to one which may perform contour or profile milling.

Another object of the invention is to disclose and provide a novel means for connecting one end of an arbor shaft to a support or pressure-applying means for the cutting tool carried by the shaft.

A further object of the invention is to disclose and provide a novel milling machine construction wherein the axis of the cutting tool may be controllably moved through a selected angular range with respect to a work piece.

Generally speaking, the present invention contemplates an arbor shaft carrying a cutting tool, one end of the arbor shaft being mounted to permit angular movement of said shaft through a selected angular range while, at the same time, transmitting rotary forces to the cutting tool and the other end of the arbor shaft being supported to permit such angular change and at the same time to provide means for applying desired tool pressure to a work piece while following a pre-selected path.

It will be understood that various other objects and advantages will be readily apparent to those skilled in the art from the following description of the drawings in which exemplary embodiments of the present invention are shown.

In the drawings:

FIG. 1 is a fragmentary side elevational view of a milling machine embodying this invention.

FIG. 2 is a fragmentary end view of the machine shown in FIG. 1, the view being taken from the vertical plane indicated by line II—II of FIG. 1.

FIG. 3 is a vertical sectional view taken in a plane bisecting the connecting means between the drive shaft and the arbor shaft.

FIG. 4 is a sectional view taken in the plane indicated by line IV—IV of FIG. 3.

FIG. 5 is a sectional view taken in the vertical plane indicated by line V—V of FIG. 1.

FIG. 6 is a transverse horizontal sectional view taken in the plane indicated by line VI—VI of FIG. 1.

FIG. 7 is a fragmentary elevational view illustrating a different modification of the invention in which the arbor is adapted to move horizontally.

FIG. 8 is a sectional view taken in the plane indicated by line VIII—VIII of FIG. 7.

FIG. 9 is an elevational view of another modification of this invention illustrating a milling machine as used as a drilling machine, side mill, or internal cutting machine.

In the drawings, FIGS. 1-6 inclusive, is illustrated a multipurpose swivel arbor on a horizontal type milling machine which embodies the present invention. The milling machine 15 maye include a base frame 16 having a machine bed or mill table 17, a machine head or head stock 18, a crossover means 19 which extends above the machine bed 17, a template means 20 cooperable with an arbor shaft 21 for guiding cutting tool 22 in a selected path, and means to support arbor shaft 21 and to apply necessary pressure thereto for a milling operation.

Base frame 16 is only fragmentarily shown and may be any suitable well-known design and construction used for milling machine bases.

Machine bed 17, in this example, is movable relative to base frame 16 and may reciprocate in a horizontal plane in well-known manner. Machine bed 17 is adapted to carry work piece 25, indicated by phantom lines, and is adapted to be fixedly clamped to machine bed 17 in suitable well-known manner.

Machine head 18 is only fragmentarily illustrated and may be of any well-known manufacture. Machine head 18 may include a motor means (not shown) having a motor drive shaft 27 which has one end 28 extending outwardly from a face of machine head 18. Drive shaft 27 may have an axis which is virtually horizontal. Arbor shaft 21 overlies machine bed 17 in selected spaced relation and its axis may be selectively angularly related to the axis of drive shaft 27. Milling cutting tool 22 (in this example, a slab cutter) is fixedly mounted on arbor shaft 21 in well-known manner and is positionable intermediate the ends of arbor shaft 21 to selectively overlie and engage work piece 25.

Swivel means 30 connecting drive shaft 27 with arbor shaft 21 to provide limited angular adjustment and movement of arbor shaft 21 in a plane vertical to bed 17 may comprise a housing 31 including a socket housing portion 32 (FIG. 3) secured by a threaded connection at 33 to the outer end of drive shaft 27. Housing portion 32 includes an outwardly facing semi-spherical recess 34 having a polar diameter coaxial with the axis of drive shaft 27. An annular housing cap 35 has an enlarged opening 36 for receiving one end of 38 of arbor shaft 21, said cap 35 having a spherical internal zonal face 37 corresponding in radius to that of spherical recess 34. Suitable means are provided for securing cap 35 to housing portion 32 in well-known manner such as by screw bolts or bolt assemblies.

End 38 of arbor shaft 21 is provided with a spherical metal swivel ball 40 having a diametrical bore 41 which receives arbor shaft end 38 to which ball 40 may be secured as by a countersunk coaxial cap screw 42. A transverse lock pin 43 may extend through end 38 and into and through ball 40 so as to immovably, non-rotatably secure ball 40 to arbor shaft 21.

Means to limit movement of arbor shaft 21 about the center of ball 40 in a plane through a selected angular range may comprise a pair of diametrically opposite grooves 45 provided in the spherical surface of ball 40 and extending in the direction of the axis of arbor shaft 21. Grooves 45 are part circular in section and partially receive bearing balls 46 which are rotatably held in part spherical recesses 47 formed by the conjunction of housing portion 32 and cap 35 at diametrically opposite locations. Each ball 46 has a diameter approximately the diameter of part spherical recesses 47 and are thereby retained in housing 31. Since grooves 45 have a transverse section and end configuration corresponding to balls 46, swivel ball 40 carried on end 38 of arbor shaft 21 will be permitted limited movement about the center of ball 40 to the extent of the length of grooves 45 while at the same time rotative driving forces of motor shaft 28 will be transmitted by bearing balls 45 to the arbor shaft.

Template means or member 20 (FIGS. 1, 2) may be carried by machine bed 17 on a template holder 50 supported from bed 17 in well-known suitable manner. Template member 20, in this example, comprises an elongated straight bar seated in a groove 51 in template holder 50. Template member 20 includes a top cam edge face 52 of selected configuration to produce desired shaping or configuration of the surface of a work piece to be engaged by cutter tool 22. The cam face 52 may be engaged by a follower ring or rolling stylus 53 freely rotatably supported upon arbor shaft 21 adjacent to its outer end. Rotatable mounting of follower ring 53 is not shown and may be of any suitable bearing construction. The outer surface of follower ring 53 may be arcuate in cross-section so as to provide a desired virtually line contact with cam face 52 as template member 20 is moved with the movable machine bed past arbor 21.

Means to support and hold follower ring 53 in proper pressure engagement with the cam face 52 and to also provide desired tool pressure on milling cutting tool 22 may comprise a crossover means 19 carried by machine head 18 and extending horizontally therefrom over machine bed 17 and above arbor shaft 21 and drive shaft connecting means 31. In this example, crossover means 19 may comprise a pair of rigid cylindrical members or tubes 55, the outer ends of which are received within sockets 56 provided in a mounting block 57 (FIGS. 5 and 6). The sockets 56 may be interconnected by a horizontal transverse slot 58 so that a securement screw bolt 59 threaded as at 60 into the lower portion of the mounting block may draw opposed portions of the mounting block towards each other to provide frictional clamping of ends of tubes 55. The mounting block 57 supports an upstanding post or member 61 and also on its outer face, a vertically disposed slide member 62. Slide member 62 provides a dovetail slide groove 63 for engagement with a movable vertical slide member 64. The upper end of slide member 64 is connected to a depending portion of a piston rod 65 which extends into a double acting fluid cylinder means 23 which may be carried by suitable brackets 66 adjacent the top portion of post 61. Cylinder means 23 may be provided with pressure fluid connections 67 at opposite ends thereof, said fluid connections 67 being in communication with a suitable source of fluid power so that pressure on opposite sides of a piston head in the cylinder will be under balanced conditions while at the same time affording a downwardly directed milling pressure which will transmit through vertical slide member 64 a desired pressure to milling cutter 22 and cam follower ring 53.

Means for connecting vertical slide member 64 to arbor shaft 21 to permit angular movement of the arbor shaft 21 with respect to vertical slide member 64 may comprise a self-aligning bearing 68 slidably carried by arbor shaft 21 between follower ring 53 and cutting tool 22. Self-aligning bearing 68 may be of any well-known construction and may have its inner race slidably mounted on arbor shaft 21 and its outer race secured to inner surfaces of a bore provided in vertical slide member 64. The selected length of the arbor shaft, the out of axial alignment or angular relationship permitted by the self-aligning bearing between the slide member 64 and the arbor shaft, and the slidable mounting of the inner race on shaft 21 allows such angular movement of the arbor shaft about the swivel mounting. An example of such a self-aligning bearing means is illustrated in FIG. 8 and is indicated at 68′.

Vertical slide member 64 may carry a set of indicia 70 thereon calibrated from zero to twenty degrees in an upper direction and from zero to twenty degrees in a downward direction from zero. A fixed reference mark 71 may be provided on slide member 62. In FIG. 1, it will be readily apparent that the exemplary angular disposition of arbor shaft 21 is approximately 20 degrees below horizontal. In such position, with reference to FIG. 3, it will be noticed that the upper bearing ball 46 would be disposed at the left end of groove 45 and lower bearing ball 46 would be disposed at the right end of its respective groove 45. The end configurations of said grooves 45 act as stop means for limiting such angular movement.

In operation of the milling machine described above, it will be understood that work piece 25 will be clamped to machine bed 17 and that in this exemplary milling machine 15, the machine bed is reciprocally movable in a horizontal plane below arbor shaft 21. The machine bed 17 may be provided with well-known vertical adjustment means so that the work may be properly positioned with respect to cutting tool 22. A selected template member 20 is mounted in template holder 50, and in the initial setup of the machine, the vertical range of movement of arbor shaft 21 is considered in order to provide desired surface configuration of the work piece and such range of vertical movement will fall within the exemplary angular 40 degree range provided by the above mounting of arbor shaft 21 with respect to motor shaft 28.

Rotation of drive shaft 27 will be transmitted to arbor shaft 21 through connecting means 30 by bearing balls 45 to the arbor swivel ball 40. As the bed 17 moves beneath the arbor shaft 21, the template member 20 carried by the bed likewise moves beneath arbor shaft 21 and the contour defined by the template face 52 is transmitted to the arbor shaft 21 through the template follower ring 53. The cutting tool 22 is held in cutting engagement with work piece 25 by the fluid actuating means 23 which directs a pressure force downwardly to slide 64 which is slidably connected to the arbor shaft 21 through self-aligning bearing means 68. Thus, the surface of work piece 25 may be milled to a configuration corresponding to that of template face 52 and the milled surface on work piece 25 may be at any selected angle within the exemplary range indicated of 40 degrees by the indicia 70.

It will be understood that a template member 20 may be omitted and that the arbor shaft may be held in fixed relation at a selected angle or in select relation to the work piece for performing a selected milling operation on the work piece. Thus, the vertical slide member 64 may be secured in fixed relation to the vertical slide guide 62.

While cutting tool 22 is illustrated as a slab cutter, it will be understood that other types of milling cutting tools may be carried by arbor shaft 21, such as one or more side cutters.

FIGS. 7 and 8 illustrate a modification of the milling machine shown in FIG. 1 in which the arbor shaft may be supported to permit angular positioning or movement thereof through a horizontal plane instead of the vertical plane of the previous embodiment. For such a modification it will be understood that the connecting means 30 between the motor shaft and the arbor shaft will be rotated 90 degrees so that the bearing balls 46 will be disposed in a horizontal plane instead of a vertical plane and arbor shaft 21 will be located in a horizontal plane.

In this modification, vertical slide member 64 carries at its lower end a horizontal guide member 70 provided with a sliding dovetailed groove connection 71 to an arbor support block 72. Block 72 and arbor shaft 21 are slidably interconnected by self-aligning bearing means 68' carried by block 72. As horizontally disposed arbor shaft 21 is moved about the center of the swivel ball at connection 30, mounting block 72 readily slides on member 70. This adaptation is useful for performing spiral milling operations.

FIG. 9 shows an embodiment of the present invention adapted to a vertical mill. A vertical milling head 18' is provided with a swivel connection 30' to an arbor shaft 21' as in the first described embodiment. Arbor shaft 21' extends through a self-aligning bearing 68' carried by a horizontal slide member 80 guided by guide member 81 supported from a vertically adjustable cylindrical member 82 carried by an upstanding standard or post 83. Arbor shaft 21' carries at its lower end an end milling cutting tool 84 disposed above a movable work table or machine bed 17' carried by a machine frame 16'. Extending horizontally from the cylindrical member 82 may be a template support means 50' which carries the template member 20' secured thereto in suitable manner as by screw bolts 85. Template face 52' may be engaged by a freely rotatable roller 86 mounted on an axle carried by a yoke-like end 87 of slide member 80. Slide member 80 may carry an angle bracket 88 which positions one end of a pressure coil spring 89 positioned at its other end against cylindrical member 82. Spring 89 biases horizontal slide 80 against template 20' so that the end mill 84 will follow the contour of the template member 20'. It will be understood that a fluid actuated cylinder means such as 23 in the first embodiment may be employed instead of spring 89 in order to provide the desired pressure forces and to control the position of the arbor shaft 21'.

Operation of the embodiment of this invention in FIG. 9 is virtually the same as that described for the first embodiment and the plane of angular positioning of arbor shaft 21 with respect to the vertical axis of the motor shaft of milling head 18' will depend upon the relative position of the swivel connection 30' and the relationship of the retaining balls 46 therein with respect to such plane. In the present example, arbor shaft 21' may move through a selected angular range in a vertical plane in the direction of the axis of slide member 80.

Those skilled in the art will recognize the advantages of the swivel mounting of an arbor shaft with respect to its motor driving shaft and the means by which the arbor shaft is held and supported at its opposite end or free end. The different and various ways in which such an arbor shaft may be employed for modifying the milling operations of standard or plain milling machines provides a means for adapting such standard milling machines to multi-purpose machines capable of performing additional milling functions.

It will be understood by those skilled in the art that various modifications and changes may be made in the examples of the invention described above and which come within the spirit of this invention and all such modifications and changes coming within the scope of the appended claims are embraced thereby.

I claim:

1. In a milling machine for milling surfaces on a work piece in accordance with a preselected configuration provided by a template, the combination of: a base frame; a machine bed on said frame; a machine head on said frame, said head and bed being relatively movable; a rotatable driving shaft carried by said head; an arbor shaft extending over said bed and having a cutting tool thereon; swivel means connecting said driving shaft to said arbor shaft for rotating the arbor shaft and providing relative angular movement therebetween in a selected plane; and means slidably connected to the arbor shaft remote from the driving shaft for supporting said arbor shaft during such angular movement.

2. In a milling machine as stated in claim 1, including means carried by the arbor shaft adjacent the remote connecting means for engaging a template surface.

3. In a milling machine as stated in claim 1, wherein said means connecting said driving shaft to said arbor shaft includes a ball and socket means.

4. In a milling machine as stated in claim 1, wherein said means connected to the arbor shaft remote from the driving shaft includes a crossover means carried by said machine head, and fluid actuated means carried by said crossover means and connected with said arbor shaft.

5. In a milling machine as stated in claim 4 including a slide member connected to said fluid actuated means and a self-aligning bearing means connecting said slide member to said arbor shaft.

6. In a universal milling machine including a machine frame, machine bed, and a machine head stock, the combination of: a drive shaft carried by the machine head; a crossover member extending from said head stock over the machine bed; an arbor connected to said drive shaft and having a portion extending over said bed; means to support the free end of the arbor from the crossover member; template means carried by the bed and engaged by the arbor; and a cutting tool carried by the arbor between the support means and the drive shaft above the work piece.

7. In a milling machine including a base frame, a machine bed on said frame, a machine head on said frame, the head and bed being relatively movable, the combination of: a rotatable driving shaft carried by said head; an arbor shaft; swivel means connecting said driving shaft to said arbor shaft; a cutting tool carried by said arbor shaft; and means connected to said arbor shaft in spaced relation to said swivel means for supporting said arbor shaft; said arbor shaft being vertically disposed, and said support means for said arbor shaft being horizontally disposed.

8. A milling machine as stated in claim 7 wherein said means supporting said arbor shaft includes a slide member, and means biasing said slide members in one direction.

9. In a milling machine including a base frame, a machine bed on said frame, a machine head on said frame, the head and bed being relatively movable, the combination of: a rotatable driving shaft carried by said head; an arbor shaft; swivel means connecting said driving shaft to said arbor shaft; a cutting tool carried by said arbor shaft; means connected to said arbor shaft in spaced relation to said swivel means for supporting said arbor shaft; an upstanding standard carried by said machine frame; and a vertically adjustable member on said standard carrying said means for supporting said arbor shaft.

References Cited by the Examiner
UNITED STATES PATENTS
803,137  10/1905  Salmon _____ 90—13.2

WILLIAM W. DYER, Jr., *Primary Examiner.*

G. A. DOST, *Assistant Examiner.*